United States Patent
Kraus et al.

(10) Patent No.: US 8,627,746 B2
(45) Date of Patent: Jan. 14, 2014

(54) TRANSMISSION, PARTICULARLY COMPRESSOR WHEEL GEAR AND METHODS TO IMPROVE THE STARTING BEHAVIOR OF SUCH

(75) Inventors: Clemens Kraus, Sonthofen (DE); Ulrich Kempter, Burgberg (DE)

(73) Assignee: Voith Patent GmbH, Heidenheim (DE)

( * ) Notice: Subject to any disclaimer, the term of this patent is extended or adjusted under 35 U.S.C. 154(b) by 212 days.

(21) Appl. No.: 13/066,494

(22) Filed: Apr. 15, 2011

(65) Prior Publication Data

US 2012/0002909 A1  Jan. 5, 2012

(30) Foreign Application Priority Data

Apr. 21, 2010  (DE) .......................... 10 2010 015 724

(51) Int. Cl.
*F16H 37/06* (2006.01)
(52) U.S. Cl.
USPC ........................... 74/665 GA; 74/440; 74/650
(58) Field of Classification Search
USPC ........................... 74/650, 665 F, 665 GA, 440
See application file for complete search history.

(56) References Cited

U.S. PATENT DOCUMENTS

| | | | | |
|---|---|---|---|---|
| 4,365,146 A | * | 12/1982 | Smilgys .................... | 235/131 R |
| 4,365,147 A | * | 12/1982 | Lombardo et al. ........ | 235/131 R |
| 4,422,344 A | * | 12/1983 | Wutherich ...................... | 74/409 |
| 4,811,615 A | * | 3/1989 | Rea ................... | 74/375 |
| 5,741,209 A | * | 4/1998 | Hillebrand et al. ........... | 493/424 |
| 7,004,871 B2 | * | 2/2006 | Tanikawa ..................... | 475/114 |

FOREIGN PATENT DOCUMENTS

| | | |
|---|---|---|
| CH | 449 659 | 1/1968 |
| DE | 100 03 018 | 7/2001 |

* cited by examiner

*Primary Examiner* — Ha D Ho
(74) *Attorney, Agent, or Firm* — Farjami & Farjami LLP

(57) ABSTRACT

A transmission installed between a drive machine and a unit to be driven, the transmission being fitted with a drive shaft and a driven shaft, wherein the drive shaft is in driving connection with the driven shaft for speed/torque conversion, and wherein the driven shaft is supported in the transmission using at least one primary axial bearing. The transmission including a starting unit absorbing axial loads of the driven shaft, wherein the starting unit comprises a secondary axial bearing, and wherein the starting unit is formed in such a way that when the unit is actuated, the axial loads of the driven shaft are substantially completely absorbed by the secondary axial bearing.

17 Claims, 2 Drawing Sheets

TRANSMISSION, PARTICULARLY COMPRESSOR WHEEL GEAR AND METHODS TO IMPROVE THE STARTING BEHAVIOR OF SUCH

This is a U.S. application which is based on, and claims priority from foreign application Serial No. 102010015724.4, filed Apr. 21, 2010, in Germany.

The invention concerns a transmission, in particular a compressor transmission, wherein the transmission is installed between a drive machine and a unit to be driven, as well as a method for improving the starting behaviour when starting such a transmission.

Preferably, such transmissions find their application in various installations, in particular industrial plants. Such units may be for instance high-speed compressor units (turbo compressors).

Consequently, the mounting assembly of the high-speed transmissions is subjected to high constraints, which for example form gear ratios of the transmission via straight or helically cut pinions and toothed gears.

Known mounting assemblies address the support of occurring axial forces by means of axial bearings, notably axial slide bearings and preferably by means of hydrodynamic slide bearings. The latter rest on the principle that a volume stream of lubricant is introduced in the slide pairing of the bearing (i.e. the sliding surfaces carrying the friction force, which are formed by the shaft journal and the bearing shell of the bearing), so that a hydrodynamic lubricant film forms between both friction partners as of a certain rotation speed of the shaft journal, which film finally carries the shaft journal. Such hydrodynamic slide bearings have proven particularly advantageous with high-speed shafts. The reason is that the shaft journal does not come substantially directly in contact with the bearing shell, for example via solid body friction, and hence does not cause any additional wear of the bearing.

It has also been suggested to support shafts by means of so-called pressure pads, which function as a kind of hydrodynamic slide bearing. To do so, a radial protuberance is provided on the shaft in the region of the pinion, which is introduced by forming an axial as well as radial gap in a ring groove which acts as a bearing shell. In case of reversal of the rotation direction of the shaft to be supported, the axial force direction is reversed, so that preferably such a pressure pad is provided on both sides of the pinion. Consequently, the shaft is so to say mounted buoyant in the pressure pads. It means that it may move about an axial play (pressure pad clearance) substantially along its longitudinal axis. Such pressure pads ensure an improved degree of efficiency of the transmission first and foremost with high-speed shafts.

The use of such pressure pads has proven useful in the past, however the support system using the pressure pad as generally with hydrodynamic slide bearings only once the shaft has reached a set relative rotation speed is efficient. The reason is that the lubricant film cannot form in a stable manner in the pressure pad at low rotation speeds. The great shortcoming is that such a workable lubricant film only appears after quite a long time, i.e. once the shaft has reached the set rotation speed. This applies in particular to starting cycles from standstill for shafts mounted in this manner.

If now the above described transmissions including the related bearings, as defined in the invention, are used in compressor units for speed/torque conversion this tends to slow down the build-up of a workable lubricant film. The reason is that at low rotation speeds of the compressor additional, high axial thrusts are created which are brought about by gas forces in the compressor. These axial thrusts are transmitted via the drive shaft of the transmission and have a spurious effect on the build-up of lubricant film of the pressure pads. Consequently, pressure pads are exposed to increased loads notably when accelerating the shaft mounted therewith and when slowing down from operating speed to standstill. These loads can lower the whole degree of efficiency of this mounting assembly and reduce their lifetime.

The object of the present invention is hence to provide a transmission which has solved the shortcomings of the state of the art. Consequently, the aim is to secure fast build-up of lubricating oil in the bearings in particular when starting the transmission. Moreover, the axial loads are absorbed optimally by the bearings in particular during the starting cycle, while keeping wear to a minimum and securing long lifetime of the transmission and its bearings. Moreover, a method should be provided to improve the starting behaviour of the transmission.

The object is satisfied by the independent claims. The dependent claims represent particularly preferred embodiments of the invention.

The transmission according to the invention, which can be arranged in particular as a compressor transmission between a drive machine and a unit to be driven, comprises a drive shaft and a driven shaft. To do so, the drive shaft is in driving connection with the driven shaft for speed/torque conversion. Moreover, the driven shaft is supported in the transmission by means of at least one primary axial bearing. According to the invention, a starting unit is provided for absorbing the axial loads of the driven shaft. The starting unit comprises a secondary axial bearing. The starting unit is designed in a way that when said unit is actuated, the axial loads of the driven shaft are substantially completely absorbed by the secondary axial bearing.

The compressor transmission can be a single-stage compressor transmission.

The drive shaft can hence be an input shaft of the transmission which for instance is in mechanical drive connection with a drive shaft of the drive machine or can be switched in such a unit. The driven shaft may perfectly be an output shaft of the transmission, which is in mechanical drive connection with the unit to be driven or similarly can be connected in such a unit. The starting unit is then associated with the output shaft for bypassing the primary axial bearing. By bypassing is meant here mechanical bridging of the primary axial bearing. With this bypassing, the output shaft is momentarily exclusively supported by means of the secondary axial bearing. For that purpose, the starting unit can be designed in such a way that the secondary axial bearing assigned thereto can be activated and deactivated for absorbing the axial loads. The secondary axial bearing can hence be arranged in the region of an end of the output shaft so that the whole axial loads are absorbed when the secondary axial bearing is activated by the starting unit and when the secondary axial bearing is deactivated by the primary axial bearing.

Preferably, the primary axial bearing is designed as a hydrodynamic slide bearing and the secondary axial bearing as a hydrostatic slide bearing, whereas at least one of the sliding surfaces of the secondary axial bearing, transmitting the friction force, is made of a self-lubricating material, in particular a soft metal or coated with such a metal. Such materials offer a significant emergency running property of a slide bearing, namely in case of temporary failure of oil supply or while the lubricant film is still building up.

Preferably, the primary axial bearing is designed as a pressure pad. Consequently, the pressure pad is mechanically bypassed by the secondary hydrostatic axial slide bearing, with particularly low rotation speeds of the shaft, when a uniform and workable lubricant film cannot form in the pressure pad.

The starting unit advantageously comprises a piston which can be pressurised, wherein said piston can be moved in axial direction between a supporting position, in which it supports the driven shaft and absorbs its axial loads, and a reset position, in which it does not absorb any axial loads. To do so, the front sides of the piston and of the output shaft can be facing one another, so as to form the sliding surfaces of the secondary axial bearing. When the starting unit is actuated, the piston is lifted up to a certain height, that is to say until both front sides barely contact each other. Hereby, the piston may shift the output shaft in axial direction into such a position that the axial bearing play on both sides of the pressure pad becomes equal. With the output shaft in this position, the lubricant can be "sucked in" optimally by the pressure pad in its bearing gap during the starting process. At the same time, any contact of the pressure pad with its running surfaces, substantially in axial direction, will be avoided. The consequence is reduced direct solid body friction in the pressure pad, so that its lifetime is quite significantly increased.

The piston is advantageously arranged in a piston chamber, wherein it divides the piston chamber into a first compartment and a second compartment and the piston chamber can be connected to a pressure oil supply system of the transmission via a pressure duct for supplying the lubricating oil.

The piston can preferably be actuated with lubricating oil on its the side pointing to the first compartment, so as to move it axially towards the supporting position.

If the piston is arranged as described, it can be moved in axial direction from its reset position into the supporting position simply by pressurising said piston with lubricating oil. The piston advantageously includes a lubricating oil passage via which the lubricating oil acting upon the piston so as to move it axially flows from the pressure oil supply to the sliding surfaces of the secondary axial bearing. Consequently, the pressure of the lubricating oil is not only used for shifting the piston, but enables at the same time to form the hydrostatic slide bearing, i.e. the secondary axial bearing. Thus, the supporting position of the piston between the front sides of the piston facing one another and of the output shaft may form a workable oil layer. This makes any further device for shifting the piston into its supporting position superfluous. This also enables advantageously to extend the piston always automatically towards its supporting position when the pressure oil supply system is activated towards the piston chamber or the secondary axial bearing.

The starting unit may preferably include a distance recorder for detecting the position of the piston, which can be transmitted in particular via a cable to a control device of the transmission and/or of the unit, in particular of a transmission compressor. The position can then for example in a regulating process via setpoint-actual value comparison be used selectively to activate or deactivate the starting unit or to check whether the transmission is being started at that stage or not.

A method according to the invention for improving the starting behaviour of a transmission, in particular a compressor transmission, which is installed between a drive machine and a unit to be driven, wherein the transmission comprises at least one drive shaft and one driven shaft, and wherein the driven shaft is supported by means of a primary and of a secondary axial bearing in the transmission, includes the following steps:

When starting the transmission from standstill, the primary axial bearing is momentarily deactivated, while the secondary axial bearing is activated, so that the whole axial loads of the driven shaft are absorbed by the secondary axial bearing; and upon completion of the starting cycle, conversely, the secondary axial bearing is deactivated and the primary axial bearing activated, so that the whole axial loads are supported by the primary axial bearing.

The starting process of the transmission may for instance be determined by the rotation speed of the drive shaft and of the driven shaft. The completion of the starting cycle can be characterised after a set time period has elapsed, once a certain relative rotational speed respectively a certain revolution speed of the drive shaft or of the driven shaft of the transmission has been reached.

The invention should now be described more in detail using exemplary embodiments and the accompanying figures.

Wherein

Figure 1:
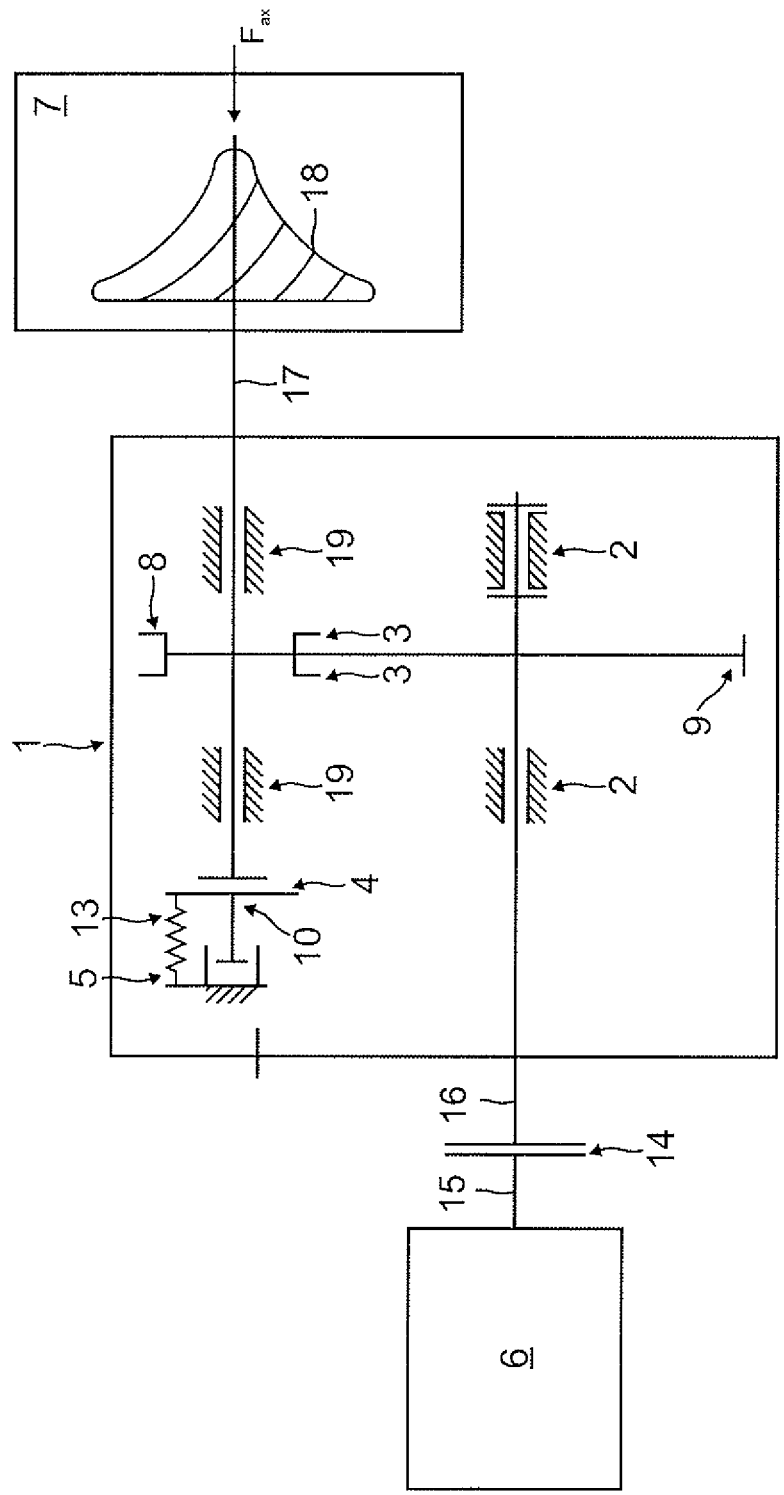
FIG. 1 is a diagrammatical illustration of a transmission, which is installed in a drive train of a stationary plant.

FIG. 1 depicts symbolically a drive train which finds its application in a stationary plant, in particular a turbo compressor plant. The following elements are connected consecutively in the drive train, in the direction of the power transmission, starting from a drive machine 6: a clutch 14, a transmission 1 as well as a unit 7 to be driven by the drive machine 6. Naturally, the clutch 14 could perfectly be arranged between the transmission 1 and the unit 7 or inside the transmission 1. In this instance, a coupling half is connected to a drive shaft 15, for instance a crankshaft of the drive machine 6, and the other coupling half to a drive shaft of the transmission. The drive shaft presents in the present case an input shaft 16 of the transmission 1 at the same time. Moreover, the transmission 1 comprises in this instance a driven shaft, which represents here the output shaft 17 of the transmission at the same time. The output shaft 17 here enables to drive the unit 7.

The input shaft 16 as well as the output shaft 17 are in driving connection with one another via a plurality of speed/torque transmission means, in particular in the form of toothed gears and pinions. The toothed gears and pinions are hence always connected in a torque-proof manner with the input shaft 16 as well as the output shaft 17. For instance, the output shaft 17 carries a pinion 8, which partakes of the power transmission with a toothed gear 9 of the input shaft 16.

The input shaft 16 and the output shaft 17 are in this instance mounted radially on both sides of the pinion 8 respectively of the toothed gear 9, see the radial bearings 2 and 19. It may of course be contemplated that the transmission 1 contains more than one drive shaft or more than one driven shaft. Moreover, the speed-torque transmission means of the transmission can be designed as straight or helically cut pinions or toothed gears.

In this instance, the input shaft 16 and the output shaft 17 are also mounted axially. So, the output shaft 17 presents a primary axial bearing 3, here in the form of a pressure pad. Consequently, such a pressure pad is provided here on both sides of the pinion 8. Both pressure pads are used for absorbing axial thrusts in rated operation of the transmission 1, once it has started. The pressure pads generate fewer friction losses during power transmission than traditional roller bearings. Moreover, the transmission 1 comprises a secondary axial bearing 4. The latter is part of a starting unit 5 comprising an axially mobile piston 10 and a spring 13 prestressed against the piston 10. The operating mode of the starting unit is described more in detail based on FIG. 2.

In FIG. 1, the drive power is transmitted from the drive machine 6, which for instance can be designed as an internal combustion machine, via the drive shaft 15, the clutch 14, the input shaft 16, the output shaft 17 to the unit 7. The unit 7 may for instance be a compressor. In such a case, the output shaft 17 can be designed at the same time as a rotor shaft of the compressor and carry a running wheel 18. If the unit 7 is designed as a compressor the output shaft 17 for instance is exposed to additional axial loads when the transmission 1 is started from standstill. Relatively high axial thrusts appear in the compressor due to gas forces, here referred to by the arrow and the symbol Fax. These axial thrusts do load both pressure pads of the outlet 17 during the starting cycle in particular and may reduce the lifetime of the transmission 1.

Figure 2:
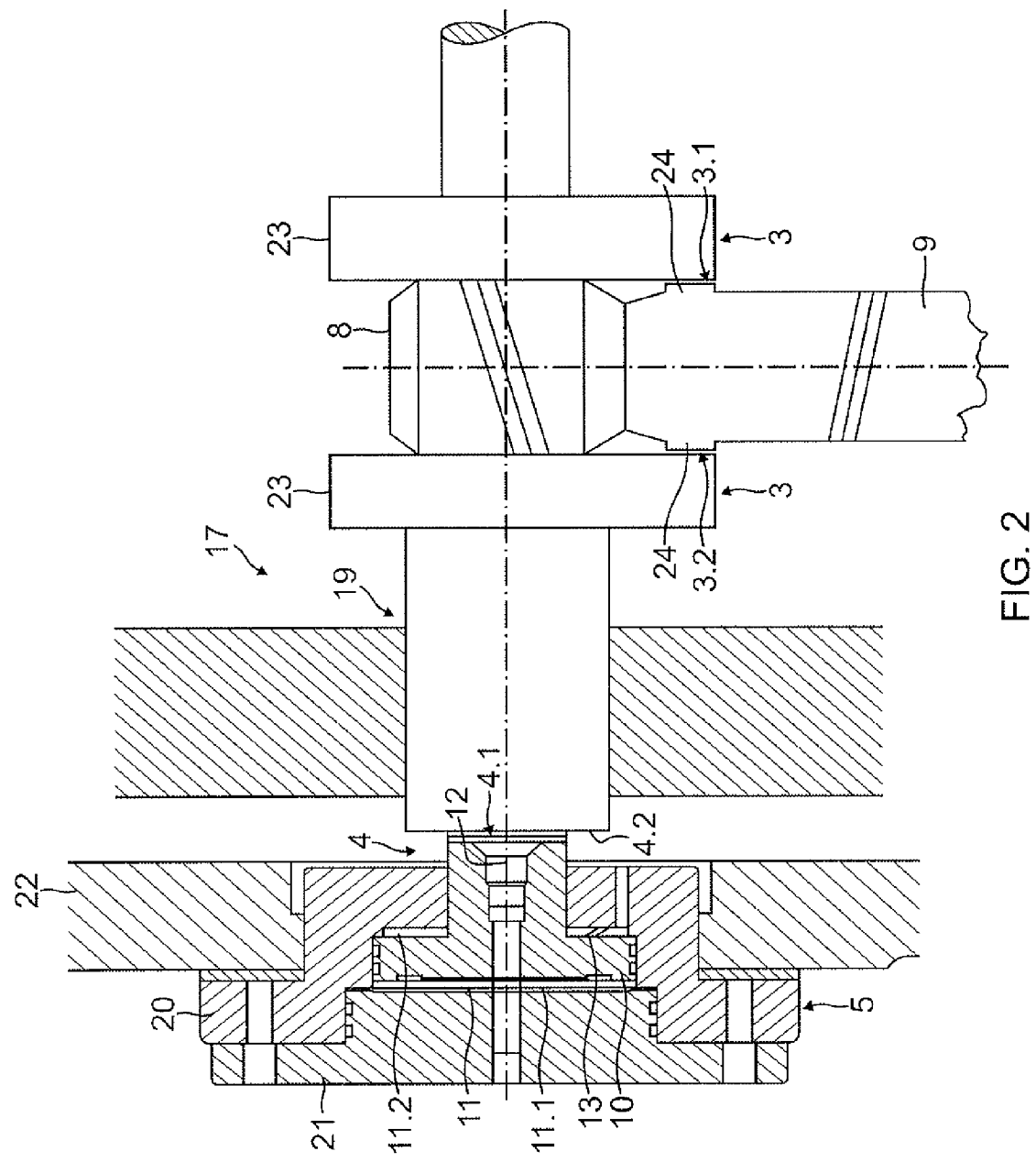
FIG. 2 is a preferred embodiment of the transmission in an axial section through the transmission.

FIG. 2 represents a preferred embodiment of a mounting assembly of the transmission 1 according to the invention in an axial section. Consequently, substantially similar elements are specified by the same reference signs. There, the output shaft 17 as well as exclusively one of both radial bearings 19 are represented. To do so, the radial bearing 19 can be designed as a roller bearing or even as a slide bearing, in particular as a hydrodynamic slide bearing. Additionally, the pinion 8 of the output shaft 17 is shown here, which partakes of the torque transmission with the toothed gear 9 of the input shaft (non represented here). Two pressure pads are provided on both sides of the pinion 8 as already described, which form the primary axial bearing 3. Each pressure pad includes a protuberance 23 protruding in radial direction of the output shaft 17. The latter exhibits a larger external diameter than the pinion 8.

The toothed gear 9 comprises in this instance a ring-shaped protuberance 24 on both sides in the radially outer region, which extends towards the rotational axis of the toothed gear 9. The ring-shaped protuberance 24 is hence designed in such a way that its radially innermost diameter lies inside the radially outermost diameter of the protrusion 23, as viewed in the elevation view of FIG. 2. The width of the toothed gear 9 on the ring-shaped protuberance 24 is designed in such a way, that the front surfaces, opposite to one another, of the protrusions 23 and 24 are separated by a given distance. The opposite front surfaces now form running surfaces 3.1, 3.2 of the individual pressure pad. The distance separating them is referred to as axial play (pressure pad clearance). This axial play enables to move the output shaft 17 along their longitudinal direction. Lubricant such as lubricating oil can be injected into the axial play when the output shaft 17 is rotating, so that a workable layer thereof can form. The output shaft 17 is supported by the pressure pad in axial direction by means of this workable layer. Until now, such a layer cannot form fast enough in particular during the starting cycles of the transmission 1. The reason is, as described above, that for obtaining such a layer, a set relative rotation speed of the output shaft 17 should prevail.

In the present case, the starting unit 5 comprising a base body 20, a piston 10 axially mobile in the base body 20 as well as a lid, is provided on the left-hand side on FIG. 2. The starting unit 5 is here arranged in a transmission housing 22 which in this instance encloses the whole transmission. The base body 20 and the lid 21 form a piston chamber 11, in which the piston 10 is installed. The latter divides the piston chamber 11 into a first compartment 11.1 and a second compartment 11.2. The lid 21 comprises a bore which secures a flow-guiding connection with a non illustrated pressure oil supply system and the piston chamber 11. The piston 10 moreover exhibits a lubricating oil passage 12 which is connected to the first compartment 11.1 to supply lubricating oil. Hereby, pressurised lubricating oil can be conveyed through the lubricating oil passage 12 of the front face of the piston 10, which faces the front face of the output shaft 17.

If the pressure oil supply system is activated the lubricating oil flows through the lid into the compartment 11.1 and presses the piston 10 to oppose the reset force of the spring 13, which is installed in the second compartment 11.2. The piston is hence, as depicted on FIG. 2, shifted to the right towards the output shaft 17. If the piston 10 abuts the front face of the output shaft 17 with its front face pointing to the output shaft 17 it will shift it by a set amount in axial direction. The lift of the piston 10 is hence designed in such a way that an identical axial play is created in the supporting position of the piston 10 for both pressure pads. In other words the piston is moved until the toothed gear 9 is situated in its axial middle position relative to both protrusions 23. In this position, any solid body friction between the running surfaces 3.1, 3.2 of both pressure pads is avoided, on the one hand. On the other hand, the injection of lubricating oil fed into the axial play, i.e. between the running surface 3.1, 3.2 of the pressure pads is facilitated.

The output shaft 17 is a little lifted in axial direction from the front face of the piston 10 since pressurised lubricating oil is not only fed through the piston chamber 11 to the compartment 11.1, but also through the piston 10 between both front sides of the piston 10 facing one another, to the output shaft 17. The front sides facing one another now form sliding surfaces 4.1, 4.2 of the hydrostatic slide bearing. Hereby, a hydrostatic slide bearing, namely the secondary axial bearing 3 is provided in the supporting position of the piston 10.

FIG. 2 shows the piston 10 in its supporting position. In that case, the secondary axial bearing 4 is activated when the pressure oil supply system is activated, while both pressure pads are deactivated momentarily. In other words, the entire axial loads of the output shaft 17 are substantially absorbed by the secondary axial bearing 4. This bridging of the pressure pads takes place preferably when starting the transmission from standstill to reach an operating rotation speed or when shutting down the transmission 1 from its operating rotation speed to standstill. The purpose of this mechanical bypassing of the pressure pads is to secure fast build-up of lubricant film in the pressure pads not only in the presence of relative low rotation speeds of the output shaft 17, but also with additional axial thrusts. The lifetime of the transmission 1 is hence increased.

Upon completion of the starting cycle, the secondary axial bearing 4 is deactivated, inasmuch as the pressure oil supply system is stopped, so that no pressurised oil can flow any longer into the piston chamber 11 respectively the compartment 11.1 for actuating the piston 10. Consequently, the spring constant of the spring 13, which is here designed as a Belleville spring, is designed in such a way that when the piston chamber 11 is substantially pressureless the piston 10 is automatically moved into its second axial end position, i.e. the reset position. To do so, the front face of the piston 10 facing the output shaft 17 moves away from the output shaft 17. The secondary axial bearing 4 is hence deactivated by the separation of both sliding surfaces 4.1, 4.2. The lift of the piston 10 is hence again designed in such a way that the output shaft 17 cannot rest on the piston 10 with its front face even when the axial bearing play of the pressure pads has disappeared.

The construction of the starting unit according to the invention offers a safety function of the hydrodynamic slide bearing (Fail-Safe): In case of failure of the pressure supply system, the piston 10 is automatically moved into its reset position in which no mechanical friction, in particular solid body friction, is permitted any longer with the front face of the output shaft 17. Any "seizure" of the piston 10 and of the output shaft 17 is hence prevented on their supporting side, if the amount of lubricant film is insufficient due to the failed pressure supply system.

It is also quite possible to realise both sliding surfaces of the secondary axial bearing 4 using self-lubricating materials, in particular soft metals, so that the bearing possesses certain emergency running properties even in case of a (short-time) failure of the pressurised oil supply system.

LIST OF REFERENCE NUMERALS

1 Transmission
2 Radial bearing
3 Primary axial bearing
3.1, 3.2 Sliding surface
4 Secondary axial bearing
4.1, 4.2 Running surface
5 Starting unit
6 Drive machine
7 Unit
8 Pinion
9 Toothed gear
10 Piston
11 Piston chamber
11.1, 11.2 Compartment
12 Lubricating oil passage
13 Spring
14 Clutch
15 Drive shaft
16 Input shaft
17 Output shaft
18 Running wheel
19 Radial bearing
20 Base body
21 Lid
22 Transmission housing
23, 24 Protuberance

The invention claimed is:

1. A transmission installed between a drive machine and a unit to be driven, the transmission being fitted with a drive shaft and a driven shaft, wherein the drive shaft is in driving connection with the driven shaft for speed/torque conversion, and wherein the driven shaft is supported in the transmission using at least one primary axial bearing, the transmission comprising:
a starting unit absorbing axial loads of the driven shaft;
wherein:
the starting unit comprises a secondary axial bearing; and
the starting unit is formed in such a way that when said unit is actuated, the axial loads of the driven shaft are substantially completely absorbed by the secondary axial bearing.

2. The transmission according to claim 1, wherein:
the primary axial bearing is designed as a hydrodynamic slide bearing and the secondary axial bearing is designed as a hydrostatic slide bearing;
at least one of sliding surfaces of the secondary axial bearing, transmitting a friction force, is made of a self-lubricating material.

3. The transmission according to claim 2, wherein the starting unit comprises a piston which can be pressurized, wherein said piston can be moved in an axial direction between a supporting position, in which said piston supports the driven shaft and absorbs the axial loads, and a reset position, in which said piston does not absorb any of the axial loads and in which said piston may be moved in the axial direction.

4. The transmission according to claim 3, wherein:
the piston is moveable in a piston chamber and divides the piston chamber into a first compartment and a second compartment;
the first compartment is connected to a pressure oil supply of the transmission for pressurising the piston.

5. The transmission according to 3, wherein the piston exhibits a lubricating oil passage, via which a lubricating oil acting upon the piston so as to move said piston axially flows from the pressure oil supply to the sliding surfaces transmitting the friction force so that a workable oil layer can be obtained between said elements.

6. The transmission according to 4, wherein the piston exhibits a lubricating oil passage, via which a lubricating oil acting upon the piston so as to move said piston axially flows from the pressure oil supply to the sliding surfaces transmitting the friction force so that a workable oil layer can be obtained between said elements.

7. The transmission according to claim 3, wherein:
the piston is preloaded using a spring whose resilience opposes a compression force of a lubricating oil acting as a displacement force;
a spring constant of the spring is designed in such a way that in case of relatively low lubricating oil pressure or a substantially pressureless state of the piston, said piston can be shifted to a reset position of the piston by a resilience acting as a reset force.

8. The transmission according to claim 4, wherein:
the piston is preloaded using a spring whose resilience opposes a compression force of a lubricating oil acting as a displacement force;
a spring constant of the spring is designed in such a way that in case of relatively low lubricating oil pressure or a substantially pressureless state of the piston, said piston can be shifted to a reset position of the piston by a resilience acting as a reset force.

9. The transmission according to claim 5, wherein:
the piston is preloaded using a spring whose resilience opposes a compression force of a lubricating oil acting as a displacement force;
a spring constant of the spring is designed in such a way that in case of relatively low lubricating oil pressure or a substantially pressureless state of the piston, said piston can be shifted to a reset position of the piston by a resilience acting as a reset force.

10. The transmission according to claim 6, wherein:
the piston is preloaded using a spring whose resilience opposes a compression force of a lubricating oil acting as a displacement force;
a spring constant of the spring is designed in such a way that in case of relatively low lubricating oil pressure or a substantially pressureless state of the piston, said piston can be shifted to a reset position of the piston by a resilience acting as a reset force.

11. The transmission according to claim 7, wherein the spring is installed in the second compartment of the piston chamber and is supported with one ends end of the spring on a front side of the piston and with another end of the spring on the starting unit and on a periphery of the piston chamber.

12. The transmission according to claim 8, wherein the spring is installed in the second compartment of the piston chamber and is supported with one end of the spring on a front side of the piston and with another end of the spring on the starting unit and on a periphery of the piston chamber.

13. The transmission according to claim 10, wherein the spring is installed in the second compartment of the piston chamber and is supported with one end of the spring on a front side of the piston and with another end of the spring on the starting unit and on a periphery of the piston chamber.

14. The transmission according to claim 1, wherein the primary axial bearing is designed as a pressure pad.

15. The transmission according to claim 3, wherein the primary axial bearing is designed as a pressure pad.

16. The transmission according to claim 15, wherein an axial lift of the piston is designed in such a way that said piston when moving into the supporting position shifts the driven shaft in such an axial position so that an axial bearing play of the pressure pad on both sides is substantially equal.

17. The transmission according to claim 2, wherein the primary axial bearing is designed as a pressure pad.

\* \* \* \* \*